H. P. RICHARDS.
FEED MECHANISM FOR SEWING MACHINES.
APPLICATION FILED APR. 12, 1900.
1,054,715.
Patented Mar. 4, 1913.
6 SHEETS—SHEET 3.
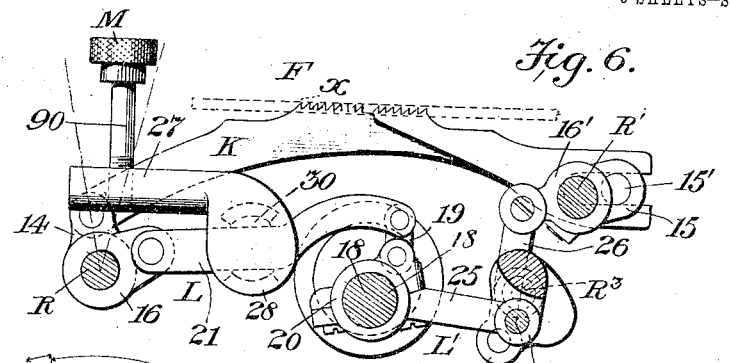
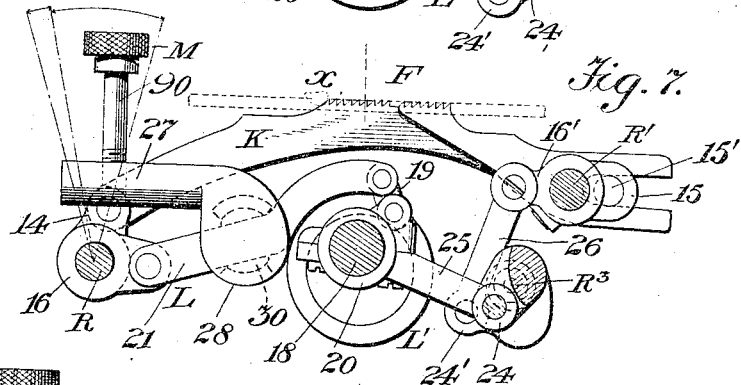
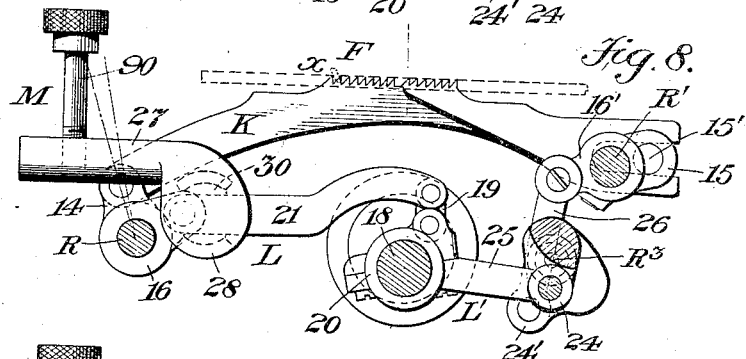
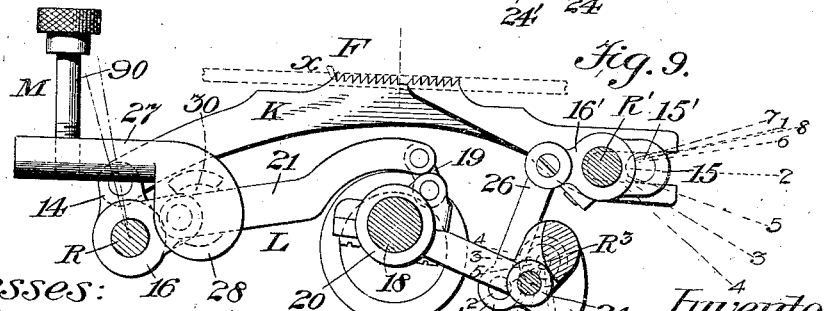
Witnesses:
Inventor,
Hubert P. Richards
By his Attorney, H. P. RICHARDS.
FEED MECHANISM FOR SEWING MACHINES.
APPLICATION FILED APR. 12, 1900.
1,054,715.
Patented Mar. 4, 1913.
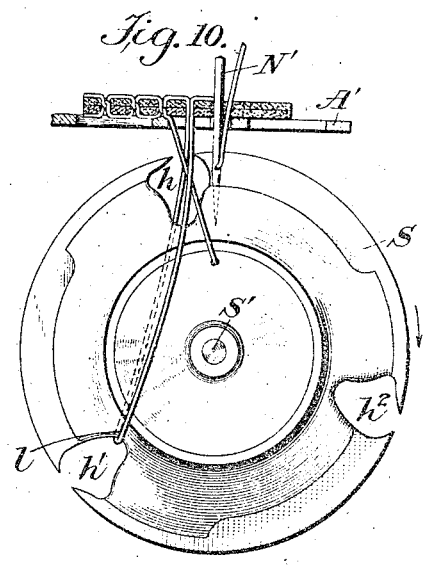
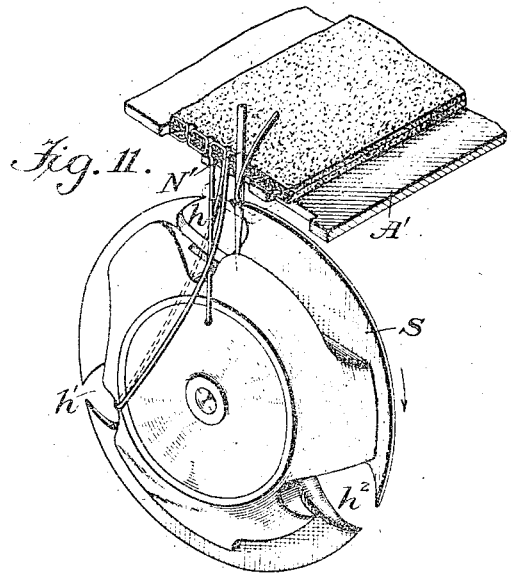
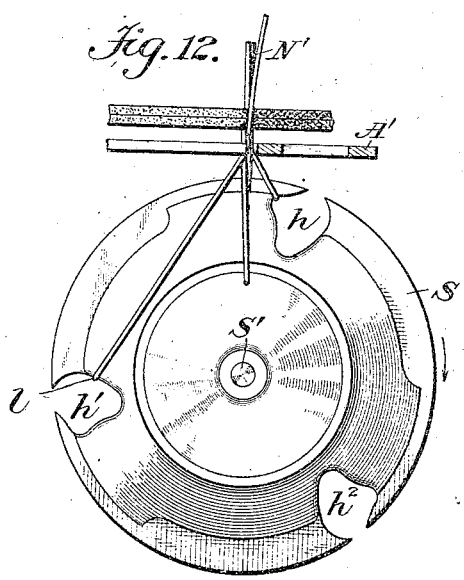
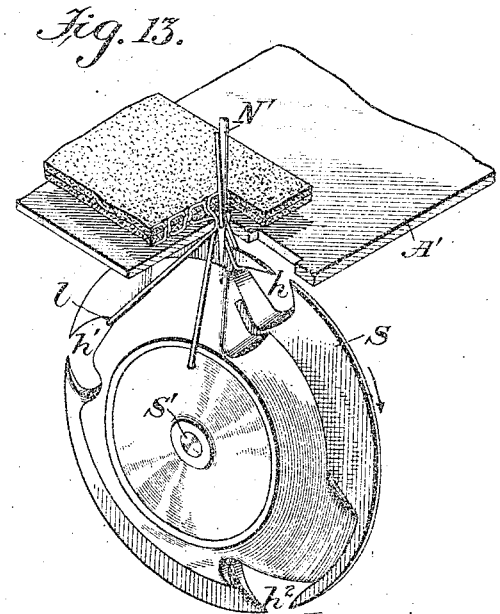
Witnesses:—
Inventor,
Hubert P. Richards
By his Attorney, H. P. RICHARDS.
FEED MECHANISM FOR SEWING MACHINES.
APPLICATION FILED APR. 12, 1900.

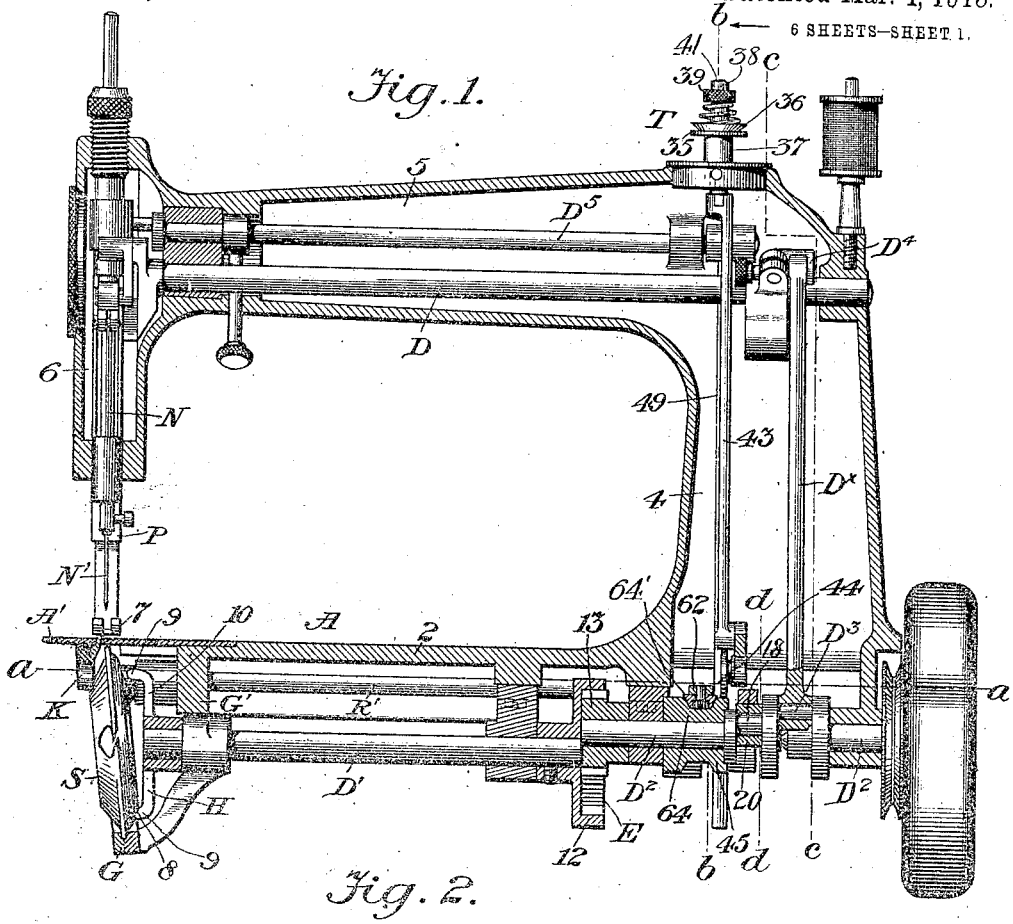

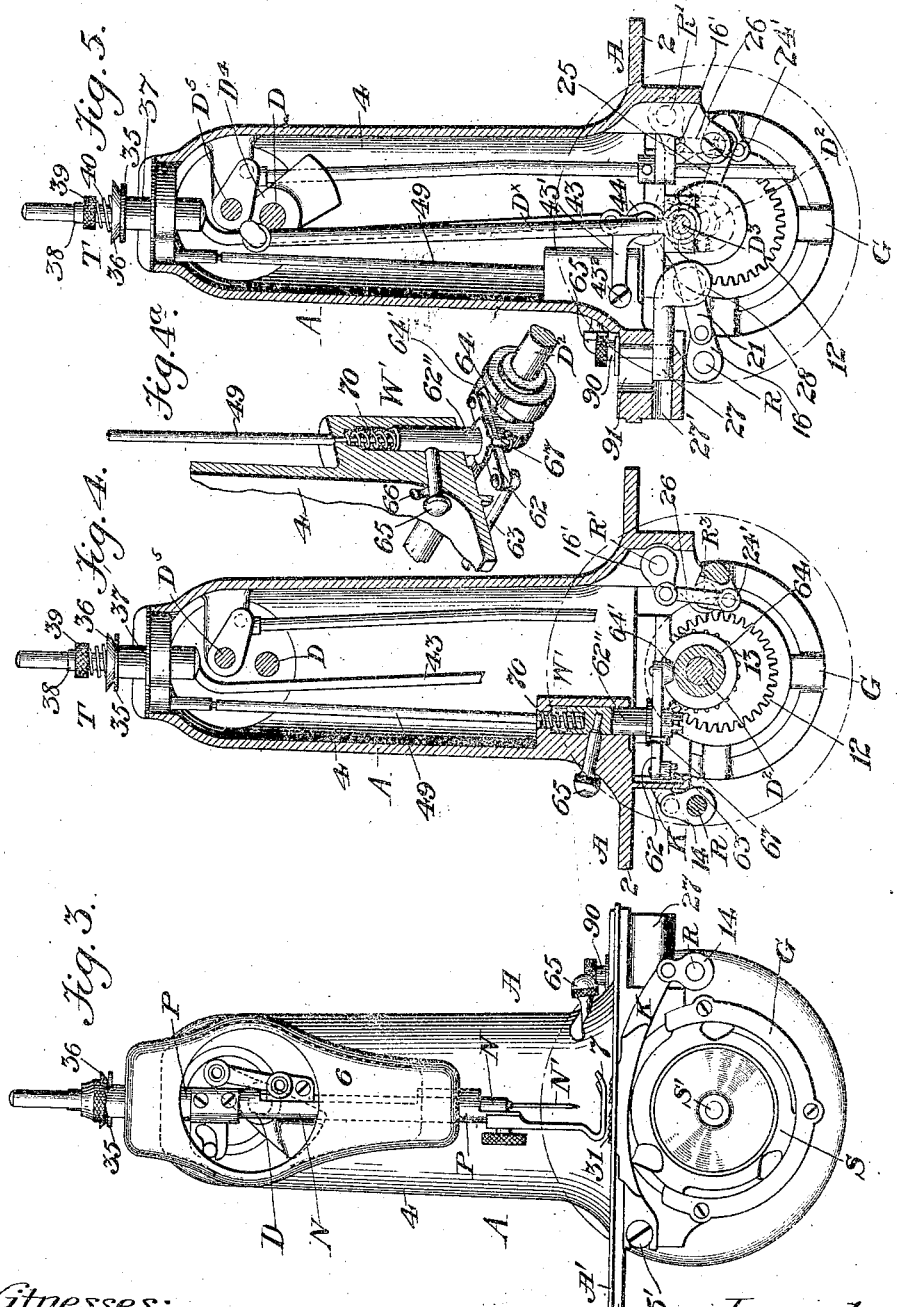

1,054,715.

Patented Mar. 4, 1913.

6 SHEETS—SHEET 5.

Witnesses:—

Inventor,
Hubert P. Richards
By his Attorney,

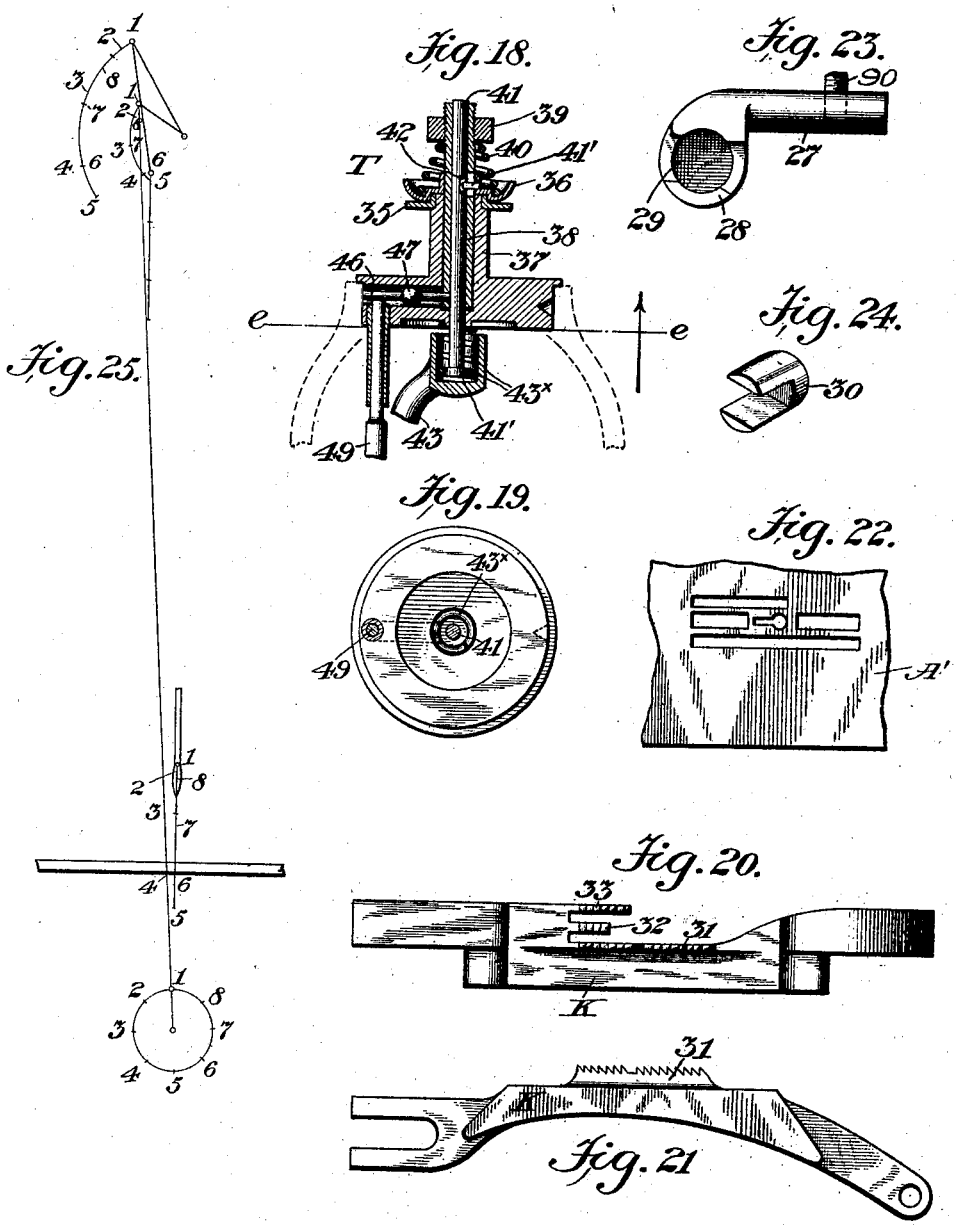

UNITED STATES PATENT OFFICE.

HUBERT P. RICHARDS, OF NEW BRITAIN, CONNECTICUT, ASSIGNOR TO J. EVARTS TRACY, OF PLAINFIELD, NEW JERSEY.

FEED MECHANISM FOR SEWING-MACHINES.

1,054,715. Specification of Letters Patent. Patented Mar. 4, 1913.

Application filed April 12, 1900. Serial No. 12,516.

*To all whom it may concern:*

Be it known that I, HUBERT P. RICHARDS, a citizen of the United States, residing in New Britain, in the county of Hartford and State of Connecticut, have invented certain new and useful Improvements in Feed Mechanism for Sewing-Machines, of which the following is a specification.

My invention relates to feed mechanism for sewing-machines, and has for its object a construction whereby improved results may be effected in a manner hereinafter set forth.

A further object of the invention is the provision of improved feed mechanism comprehending means for varying the working stroke of the feed member and for changing the initial position thereof, whereby it will engage the fabric at different points with relation to the presser-foot and needle-path.

A further object of the invention is the provision of a feed member of particular construction which coöperates with the stitch-forming mechanism in a novel manner in the formation of different kinds of stitches.

Figure 14:
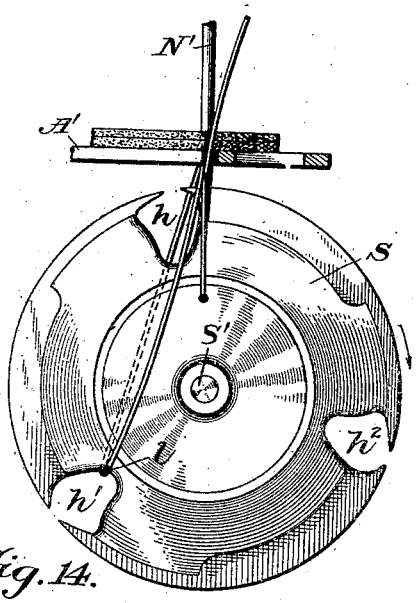
Figure 15:
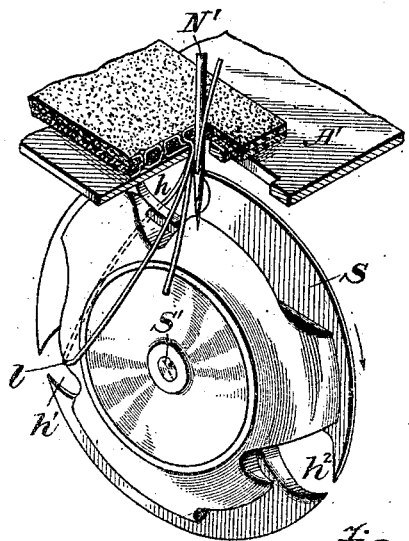
Figure 16:
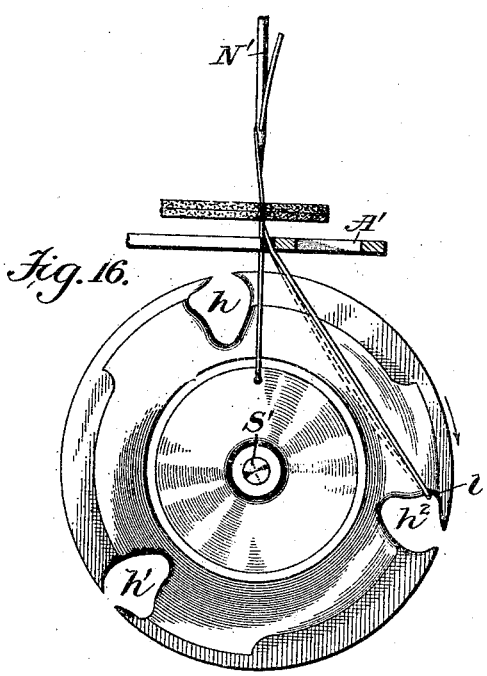
Figure 17:
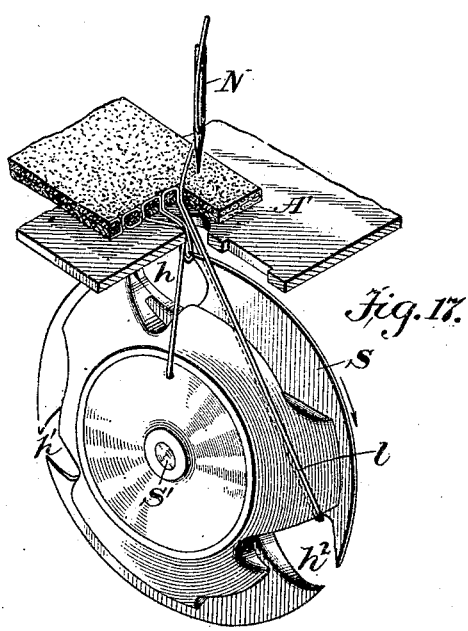

In the accompanying drawings, Figure 1 is a vertical longitudinal section of a sewing-machine to which my improvement is applied. Fig. 2 is a horizontal section on line *a—a*, Fig. 1, showing the crank-shafts for actuating the feed member in plan. Fig. 3 is an end view of the machine, looking toward the right in Fig. 1. Fig. 4 is a vertical cross-section on line *b—b*, Fig. 1, looking toward the left. Fig. 4ª is a perspective view, partially in section, of the device connecting one of the tension-operating devices with the lever for actuating the stitch-changing mechanism. Fig. 5 is a cross-sectional view similar to Fig. 4, taken on line *c—c*, Fig. 1, looking toward the left. Figs. 6 and 7 are enlarged details of a portion of the feed mechanism detached, illustrating, respectively, two extreme positions of the feed member or dog when set to have its maximum stroke, and also showing, by dotted lines, the peculiar path traveled by said feed member in performing its work, said figures being cross-sectional views taken on line *d—d*, Fig. 1, looking toward the left. Figs. 8 and 9 are views similar to Figs. 6 and 7, of the feed mechanism, illustrating, respectively, two extreme positions of the parts when they are set to have a minimum stroke, and also showing, by dotted outlines, the path pursued by the feed member when the parts are in this position. Fig. 10 is a side elevation of a looper employed in connection with my improved feed mechanism, the fabric being shown located upon the throat plate and an extended loop being in readiness to be drawn up by the next loop-taker when it engages a succeeding loop to form a lock-stitch, the needle being shown at the limit of its downstroke. Fig. 11 is a perspective view corresponding to Fig. 10, the fabric appearing in section to illustrate the manner of forming the stitch. Fig. 12 is a side elevation of the looper and needle, showing a loop-taker in engagement with a new loop and in the act of drawing up a preceding loop, the fabric being illustrated when raised from the throat-plate by the feed mechanism, and the needle at the inception of its return stroke, the fabric having been turned around the needle at an angle to the position shown in Figs. 10 and 11. Fig. 13 is a perspective view of the parts when in the positions represented by Fig. 12, the fabric being shown in section to disclose the mode of forming the stitch. Fig. 14 is a side elevation, and Fig. 15 a perspective view, of the stitch-forming mechanism in a different position, the fabric lying upon the cloth-plate and being swung around the needle, in the usual way, at an angle to the position shown in Figs. 10 and 11, and the strands of the loop being twisted and in contact with the edge of the needle-opening in the cloth-plate. Figs. 16 and 17 are side and perspective views of the stitch-forming mechanism in a different position, the fabric being raised by the feed mechanism and shown as turned when in such position, the loop having been drawn out. Fig. 18 is an enlarged cross-sectional view of the tension device for the needle-thread, and a portion of its actuating instrumentalities, the section being taken on dotted line *b—b*, Fig. 1. Fig. 19 is a transverse section on line *e—e*, Fig. 18, looking in the direction of the arrow. Figs. 20 and 21 are plan and side views, respectively, of the feed member or dog detached, and are drawn to the same scale as Fig. 6. Fig. 22 is a plan view of a portion of the throat or cloth plate through which the feed-dog and the needle work.

Fig. 23 is a side view of a portion of the feed-adjusting device detached. Fig. 24 is a perspective view of the pivot-plug of said feed-adjusting device, detached. Fig. 25 is a diagrammatic view illustrating the relative movements of the needle and the looper and their actuating devices; and Fig. 26 is a diagrammatic view illustrating, by full lines, the peculiar path described by a point on the feed member or dog during one cycle of its operation, and, by dotted lines, the path described by such feed member or dog after the devices for changing its stroke have been shifted.

Similar characters of reference designate like parts in all the figures of the drawings.

In the drawings, for the purpose of exemplification of my invention, I have shown the necessary parts of a sewing-machine which coöperates therewith and serves to illustrate the application and mode of operation of the improved feed mechanism.

This sewing-machine is shown comprising a framework, (designated generally by A,) which may be of any suitable construction adapted to carry the working parts of the machine; a reciprocatory needle-bar N, carrying a needle N'; a needle-bar-actuating shaft D, journaled in suitable bearings in the framework and connected with the needle-bar by a crank-and-link mechanism in a common manner; a looper S, (shown disposed at an inclination to the path of movement of and below the needle-bar,) said looper having a plurality of loop-takers; a looper-guide G, supported by a bracket G' on the framework; a driver H, for supporting and actuating the looper; a looper-actuating shaft D', supported in bearings of the machine-frame; a main driving-shaft D², located in parallelism with and preferably at one side of the axis of the looper-actuating shaft, said shaft D² being equipped with a crank D³, connected with a similar crank D⁴ on the needle-bar shaft by a link or pitman Dˣ, in the usual manner; a two-to-three train of gears E, connecting the main driving-shaft and the looper-actuating shaft; improved feed mechanism, in which my present invention resides, (designated in a general way by F and shown operated from the main driving-shaft, although it could be operated in a different manner;) a bar P, having a presser-foot 7, coöperating with the feed member or dog of said feed mechanism; a rock-shaft D⁵, mounted in the framework and connected with the presser-bar by a crank, in a well-known way, said shaft being equipped with means whereby it may be actuated either to raise or lower the presser-bar; a stitch-changing device W, coöperating with the improved feed mechanism, shiftable into and out of the position where it coöperates with the looper, and effective for engaging the loop and holding the same in proper position to permit the next succeeding loop to pass therethrough; means for controlling the operation of the stitch-changing device; a tension device (designated in a general way by T) coöperating with the stitch-changing device and the feed mechanism, in a manner hereinafter set forth; tension-modifying devices, one of which is controlled by a suitable cam and is effective for varying the tension at predetermined points, and the other of which is connected with the stitch-changing device, coöperates with the feed mechanism, and is effective for operating the tension device when the stitch-changing device and feed mechanism are shifted, as will be hereinafter set forth.

Generally speaking the framework of the machine may be substantially of the construction shown and described in Letters Patent of the United States, granted to Francis H. Richards, January 5, 1897, No. 574,573; and said framework usually comprises a bed-plate 2, having a looper-guide-supporting bracket G' at the work-supporting end thereof, a hollow upright 4 at the opposite end of the bed-plate, and a vertical head 6, at the free end of arm 5, for receiving a needle-bar. Needle-bar N and presser-bar P are shown, as in the patent mentioned, axially coincident, the needle-bar being supported for reciprocation in the presser-bar, which is in turn mounted for movement in the head 6 and is equipped at its lower end with a presser-foot 7, a spring (not shown) being in practice provided, as illustrated in said patent, for regulating the action of the presser-foot upon the fabric.

A looper S, similar to the discoidal looper set forth in the patent mentioned, or of other form, is shown supported below the bed of the machine for rotative movement in a plane oblique to the path of the needle, although it may be otherwise supported, said looper being guided and held against movement transversely of its path of action by the guide G, which extends around the lower portion of the looper and has a raceway for receiving the perimeter thereof, said raceway being in practice of sufficient depth to permit a slight diametric movement of the looper. Ordinarily this looper will be equipped with suitable means S' for carrying a cop or bobbin, and will also have a necessary tension device for the lower thread. In the form illustrated looper S is equipped with three correspondingly-disposed loop-takers h, h', and h², respectively, and has also formed in its inner face a series of driver sockets 8, disposed preferably concentric to the axis of the looper and located equidistant from one another, said sockets being adapted to receive pins 9 upon arms 10 of a driver H, which may be of the same general construction as that set forth in the patent mentioned; and said looper also has the usual series of needle-receiving grooves.

Driving-shaft $D^2$ and shaft D for actuating the needle-bar are, as above stated, connected by cranks and a pitman $D^x$ and therefore have a one-to-one ratio of movement; and the looper-actuating shaft is connected to the main driving-shaft by a two-to-three train of gearing E in such a way as to have two complete rotations to every three complete rotations of said main driving-shaft, and consequently said looper-actuating shaft has two-thirds of a complete rotation at every complete reciprocation of the needle-bar, the ratio of movement between the looper and needle being the same in the present instance as in the patent mentioned. Gear-train E is shown comprising an internal gear 12, fixed to the end of the shaft D' and a pinion 13, attached to the end of the driving-shaft $D^2$ and meshing with said internal gear.

As above stated my present invention resides in a sewing-machine of suitable kind equipped with improved feed mechanism, the latter being illustrated most clearly in Figs. 1, 2, and 4, and in Figs. 5 to 9, inclusive, of the drawings; and said feed mechanism comprises two rock-shafts R and R', located, respectively, at opposite sides of the looper-actuating shaft D' and journaled in bearings in the lower part of the machine-frame; two cranks 14 and 15, fixed, respectively, to the outer ends of the rock-shafts R and R'; a feed dog or member (designated in a general way by K) pivotally connected at one extremity to the outer end of the crank 14 and terminating at its other end in a fork or slot in shiftable connection with a wrist-pin 15', attached to the outer end of the crank 15; two cranks 16 and 16', secured, respectively, to the inner ends of the rock-shafts R and R'; a compound linkage (designated in a general way by L) for actuating the feed member or dog, said linkage connecting the crank 16 with an eccentric 18 on main driving-shaft $D^2$ and serving to advance the feed member or dog to feed the fabric; and a linkage (designated in a general way by L') connecting the crank 16' and said eccentric 18 and operating to elevate the feed member or dog at the proper time. These feed-member advancing and elevating linkages are so constructed and disposed, and are so timed in their movements one relatively to the other, that during one complete cycle of movement of the driving-shaft $D^2$ and eccentric 18 from a normal ineffective position the linkage L' will first be shifted to the position shown in Figs. 6 and 8 to cause the rock-shaft R' and its crank to elevate the feed member or dog; and then the linkage L will impart an advancing movement to the feed dog through the instrumentality of the rock-shaft R and its crank, the parts being then shifted to the positions shown in Figs. 7 and 9; and after this action has taken place linkage L' will operate to depress the feed member or dog, and linkage L will then operate to impart a retractive movement thereto, the operations of said linkages taking place in alternation. In the form shown the feed-member-advancing linkage L comprises a short link 19, pivoted at its lower end to a projection on strap 20 of eccentric 18, and a link 21, articulated at its inner end to one extremity of the link 19 and at its outer end to the free end of the crank 16. Linkage L', for elevating the feed member or dog, is shown comprising a crank-shaft $R^3$, having two differently-disposed cranks 24 and 24', a link 25, which may be formed integral with the eccentric-strap 20, articulated at its outer end to one of the cranks, as 24, of the crank-shaft $R^3$, and a link 26, articulated at its lower end to the crank 24' of said shaft $R^3$ and at its upper end to the crank 16' of the rock-shaft R'. In the operation of linkage L' the cranks and eccentric are arranged to give a comparatively short stroke to the crank 15, for elevating the feed member or dog at each rotation of the driving-shaft $D^2$, the extreme movement of said crank 15 being indicated by dotted lines in Fig. 9, and the extreme range of movement of crank 24' of intermediate crank-shaft $R^3$ being also indicated by dotted lines in said figure.

For changing the working stroke of the feed member or dog K and simultaneously shifting the position of said dog a feed-adjusting device (designated in a general way by M) is provided, which device in one of the preferred forms thereof, comprises a slide 27, supported for movement in a way 27' in the framework of the machine, said slide having at its inner end a depending portion 28, which is pivotally and adjustably connected to link 21 intermediate the ends of said link, said portion 28 constituting the fulcrum on which the link swings and also governing the range of movement of said link. To form a sliding pivotal connection between the feed-adjusting device M and link 21, the depending portion 28 of said device has a socket 29 in one of its faces, in which socket is seated a plug or pivot 30, the bifurcated end of which straddles the link 21, said plug being supported for oscillatory movement in the depending portion of said device M, as will be readily understood by reference to Figs. 23 and 24 of the drawings, and also to Figs. 6 to 9, inclusive, which illustrate by dotted lines these parts.

For shifting the device M to change the fulcrum of the link 21, and consequently the working stroke of the feed member or dog K, I have provided a device, which may be a screw 90, extending through a guideway 91 in the bed-plate of the machine (see Fig. 5) and into the slide-bar 27 of the adjusting device M, said screw having at its upper end a knurled head, which may be turned to hold the adjusting device in its changed position. When it is desired to change the stroke of the feed member or dog, and also change its working position, it is merely necessary to advance or retract the adjusting device toward or away from the inner end of the link 21, which will shift the fulcrum of said link and increase or decrease the range of travel of the working end thereof and at the same time raise or lower said working end and thereby turn the rockshaft R a corresponding distance, which latter will move the feed member longitudinally and change its initial position relatively to the needle. Thus the feed member or dog will always be centralized or at least properly repositioned with respect to the movement of the presser-foot, and that, too, whether a long stitch or a short stitch is being made, the initial-point of the working stroke of the feed-dog being farther to the right when a long stitch is to be made than when the mechanism is adjusted to form a short or fine stitch. In either case, however, that part of the feed member or dog which is adjacent to the path of movement of the needle will never move as far away from said needle-path as it would if the initial-point of the movement of the feed-dog were a fixed one common to both a short and a long feed. This construction therefore permits the presser-foot to obtain a better and firmer hold upon the material and assures a more positive feed movement when the feed mechanism is adjusted for a fine stitch than would be the case if the feed-dog were not so centralized with respect to the presser-foot for both a long and a short stroke.

Preferably the feed dog or member K will be provided with three parallel rows of teeth, 31, 32, and 33, the rows 32 and 33 extending through the rear portion of and terminating slightly remote from the center of the feed-plate, and the row 31 having one or more teeth removed at its central portion to prevent a preceding stitch from catching on a center tooth when the fabric under operation has been turned around the needle—as in turning angles when sewing. By terminating the two rows of teeth 32 and 33 slightly in the rear of the central portion of the throat plate—said portion being the part through which the needle passes—and by providing means for adjusting the working position of the feed-dog so that the forward ends of the two rows of teeth will engage the fabric at a greater distance from the path of the needle when a long stitch is being made than when a short stitch is being made the possibility of preceding stitches being caught on the teeth of the feed-dog when turning corners is entirely obviated, and at the same time said feed-dog may engage the fabric at the most practicable distance from the path of the needle to prevent kinking and secure the best results in feed.

Referring to Fig. 26, it shows successive positions, practically from one to eight inclusive, of a point on the feed-dog of the feed mechanism. A principal object of the peculiar organization of actuating mechanism shown in Figs. 6 to 9, inclusive, is to impart to the feed-dog the peculiar movement or figure of movement illustrated in a general way in said Fig. 26, by which it traces a substantially ovate or pear-shaped path of greater dimensions, as shown by full lines in said figure, when forming a long stitch, than the dimensions of said path shown by dotted lines in said figure when forming a short or a fine stitch. One object of thus operating the feed-dog is to maintain said dog in an elevated position during a certain portion of the stitch-forming operation, during which portion or period of time the looper-thread may be drawn up through the cloth-plate without so much resistance as would otherwise occur. For more clearly illustrating this feature of the invention a diagrammatic line $x$, corresponding to Fig. 26, is shown in Figs. 6, 7, 8, and 9 for exemplifying the relative places in the path of the feed movement which a given point on the feed-dog will occupy at the successive stages illustrated in said Figs. 6 to 9, respectively.

To illustrate what is meant by the description above given, attention is now invited to Figs. 10, 11, 14, and 15, by which it will be seen that when the cloth or fabric is turned at an angle to change the line of feed, the threads of the loop become crossed or twisted one partly around another (see particularly Fig. 15), so that it becomes desirable at one portion of the stitch forming operation to hold up the fabric from the throat-plate in order that the threads may not become tightly twisted and may not unduly bind or cramp one another during the operation of pulling up the preceding loop. Thus, the fabric may be turned in the usual manner to change the direction of the stitching, whether the fabric rests upon the throat-plate or is elevated. When the fabric is down, the needle is at the lower end of its stroke and the looper is engaging a new loop, and there is little or no pull upon the thread by the looper; while, owing to the elevation of the fabric during the remainder of the stitch-forming operation, the liability of cramping the strands of thread is avoided. One of the purposes of the invention is to avoid dragging the strands of the loop or loops over the throat-plate and under the cloth, and causing them to be pinched between the cloth and the plate, so as to cause a hitch or bind, with liability of straining and breaking the thread. By holding the cloth or fabric elevated from the cloth-plate during that particular period of forming the first stitch after the direction of the seam has been changed, all trouble is overcome, for the thread is left free of pressure and is thus permitted readily to be drawn up. (See Fig. 17.) Generally the operation of the looper in the present machine, in forming a lock-stitch, is similar to that of the same part described in the patent aforesaid, but the main feed mechanism is different and cooperates with the stitch-making devices in a peculiar way. In making a lock-stitch the successive loops $l$, which are formed on the descending movement of the needle, are successively engaged by the succeeding loop-takers and are carried around the looper to inclose the lower thread and form a lock-stitch, each preceding loop being drawn up by a succeeding loop as said succeeding loop is partially drawn out by the looper, as will be understood by reference to Figs. 10 to 17, inclusive.

In the organization of mechanism shown the looper S is intended constantly to be rotated in the same direction during the operation of sewing, as shown by the arrows in Figs. 3, 4, and 5, and 10 to 17, inclusive, of the drawings.

Combined with my improved feed mechanism and serving as a convenient and simple means for changing the form of stitch resulting from the normal operation of the needle and looper mechanisms hereinbefore described without effecting a change in the direction of movement of the looper or feed device or in the mode of operation of the several lock-stitch mechanisms—to wit, the looper mechanism, the needle mechanism, and the feed mechanism—I have provided a stitch-changing device (designated in a general way by W) which is in all essential characteristics substantially the same as the stitch-changing device described in my Patent No. 607,079, dated July 12, 1898, said stitch-changing device being shiftable into position for coöperating with the looper and being effective for engaging the upper portions of successive loops, and for deflecting said portions laterally of the path of the needle so that succeeding loops may pass through preceding loops and cause the stitch-forming mechanism to produce a chain-stitch or a chain-lock stitch. This stitch-changing device W comprises a loop-diverter 60, fulcrumed at 60' below the bed-plate of the machine and adapted to oscil-
late across the path of the loops, the actuating means for the loop-diverter being shown as a lever 62, a rod 63, articulated at one end to the actuating-lever 62 and at its opposite end to said loop-diverter; and a cam 64, fixed to the driving-shaft $D^2$, which cam has two oppositely-disposed working faces against which a roll 64' on the inner end of said actuating-lever bears, said cam being adapted for advancing and retracting the loop-diverter across the path of the loops, as will be understood by reference to Fig. 2 of the drawings.

For throwing the stitch-changing device out of and into operative relation with the loop, I have provided a throw-out device W', (shown as a stud 62'',) supported for rotative and longitudinal movement in a bearing formed in the framework, said stud having its lower end extending through the actuating-lever 62 and constituting a support and fulcrum for said lever.

In the above connection I have provided an actuator 65, extending through an inclined or cam groove 66, formed in the upright 4 of the machine-frame and having a head at the outer end thereof, whereby said stud 62'' may be rotated and simultaneously lowered to throw the roller end of the lever 62 into operative engagement with the working surfaces of the cam 64. This stud is equipped with a projection 67, so disposed (see Figs. 2, 4, and 4$^a$) that when the stud 62'' is raised and rotated said projection will strike said lever 62 at a point intermediate its fulcrum and outer end and throw the same toward the left, as seen in Fig. 2, to thereby shift the working end of the loop-diverter out of operative relation with the looper, the faces of the cam-groove being upwardly inclined, as shown most clearly in Figs. 1 and 4$^a$, so that when the actuator 65 is shifted toward the left the stud 62'', which carries the actuating-lever 62, will be raised and simultaneously rotated.

Actuating-cam 64 is shown constructed to impart both advancing and retractive movements to the loop-diverter, but, as will be obvious, it may be so shaped as to impart a movement only in one direction to said loop-diverter, and other means might be employed for imparting movement thereto in an opposite direction.

In a sewing-machine it is desirable that means should be provided for varying the tension of the needle-thread at different points in the movement of the looper, the construction generally preferred in sewing-machines having been one in which the tension of the thread may be decreased just before the engagement of a loop by a loop-taker, whereby breakage of the thread during the first stage of the drawing out of the loop is avoided, the tension being afterward increased just before the final drawing up of the loop. In my present improvements, the fabric is held above the throat-plate during a much longer period than usual heretofore, so as to release the loop strands and enable a fresh loop to be drawn out while the preceding loop is tightened; and during the loop-tightening operation I place the thread which comes from the spool under tension, so as to avoid the liability of the looper pulling fresh thread prematurely from the spool. It is also important, in sewing-machines having mechanism for making different kinds of stitches, that the tension should be changed in accordance with the requirements determined by the kind of stitch being made, it being necessary, for example, to place a greater tension upon the thread in the formation of a lock-stitch than in making a chain-stitch. In the present case I have provided tension-modifying means automatically operative for increasing or decreasing the tension of the thread during the making of each separate stitch, in connection with means for changing the tension in the desired way when the feed mechanism is shifted for making another kind of stitch. Hereinafter the tension-modifying means, automatically operative during the making of any stitch, will be termed a "tension-varying" device and will control the tension device coöperating directly with the thread, while the tension-modifying means, which determines the extreme degrees of tension for different stitches, will be termed a "tension-changing" device, and in the preferred embodiment of the invention will be controlled directly by the throwing of the stitch-changing device into and out of operative relation with the looper, it being obvious that when the stitch-changing device is inoperative and the mechanism operates to make a lock-stitch a high degree of tension should be employed, while when the stitch-changing device is thrown into position to coöperate with the looper and deflect the loops carried by the same the tension should be modified materially so that it will be much less than is necessary for the making of a lock-stitch. To simplify the construction, I have shown a single-thread tension device, such, for example, as that indicated by T, which will ordinarily be employed; and this tension device may be controlled by both the tension-varying device and the tension-changing device conjointly. As shown, the tension device embodies two tension-plates, such as 35 and 36, one of which, 35, may be supported on a suitable projecting portion or boss 37 of the framework, the other, 36, being in this instance loosely placed over a sleeve 38, supported for reciprocation in a bore in the boss 37, an adjustable stop or nut, such as 39, being secured to the upper screw-threaded end of said sleeve 38, between which nut and tension-plate 36 a coiled spring 40, encircling said sleeve, is placed. In this construction the part that operates directly to control the tension of said spring 40, through each stitch-making operation, is a rod 41, supported for movement in sleeve 38 and having a notch or recess 41' in its side, the wall of which is adapted to engage a pin 42, carried by tension-plate 36 and extending through a slot in the sleeve 38. When rod 41 is lifted, the pin 42, and thereby the upper tension-plate 36, will be raised slightly to decrease the tension on the thread between said plates 35 and 36. In the construction illustrated the actuating-rod 43 coöperates at its upper end with the lower extremity of the rod 41 to lift the latter, a coiled retracting-spring 43$^x$ being disposed between the lower headed end 41$^x$ of the rod 41 and a portion of the framework. At the lower end the rod 43 is connected to a lever 43' pivoted to the frame at 43$^2$ and equipped with a roll 44, which is adapted to engage with a cam or eccentric face 45 at the side of the cam 64 for actuating the stitch-changing device, the spring 43$^x$ at the upper end of the rod 43 serving to maintain the roll in contact with said face 45. Preferably during about three-fourths of each revolution of the peripheral cam 45, the roller 44 rides upon the dead face of the said cam, the rod 43 being held down out of effective position by means of the spring 43$^x$, so that during this period the thread is gripped by the tension-plate 36 under the action of the compression-spring 40. This tension period preferably begins when the new loop has just passed the period of greatest distention, or about half way between Fig. 16 and Fig. 14 positions. When the new loop is a little past the Fig. 16 or Fig. 17 position, so that the preceding loop is tightened and the formation of a stitch is hence completed, the roller 44 is forced up a trifle by the slightly protruding active portion of the peripheral cam 45, thereby causing the rod 43 to act upon the tension-plate 36 so as to relieve the tension upon the thread, so that as the looper continues to revolve in the direction of the arrow and to give the new loop its greatest distention, it may pull a fresh supply of thread from the spool. Thereupon said roller and rod, together with said plate 36, are in this instance immediately forced down by said spring 40, thus again gripping the thread. The operation of pulling out the new loop and drawing up the preceding loop preferably begins approximately at the time that the feed-dog is elevated to its highest position, so that threads may be drawn freely through the cloth, and escape the liability of being pinched between the cloth and the throat-plate, or becoming twisted tightly in case the cloth should be at any time turned to change the direction of the stitching. Preferably the descent of the feeding dog is delayed until the new loop is substantially drawn out and the preceding stitch substantially completed; and preferably tension is put upon the thread before a loop-taker engages a new loop, so that the portion of the thread above the fabric is well controlled during the entire stitch-forming operation, except during the described momentary release thereof, at which time the looper is pulling both at the completed stitch and also at the spool, so that as the stitch becomes tightened, the spool pays off a little thread. With this tension device I preferably employ a short lever, such as 46, Fig. 18, having a ball-bearing support 47 between its ends, this lever being mounted in a suitable opening in the framework and at its inner end engaging the sleeve 38 near the lower end of the latter, the outer end of said lever being in position to be turned by a thrust-rod 49 to lower the sleeve and the stop-nut 39 to increase the tension when the feed and other mechanisms are set for the making of a lock-stitch, this tension being decreased of course as soon as the rod 49 is lowered. At its lower end said rod 49 is connected with the stud 62″, which may be shifted by the knob 65 to change the position of the stitch-changing device, in the manner hereinbefore described; and when this stud 62″ is raised by the knob 65 it is locked in such position by a portion of the groove at the end of the cam-slot. (See Fig. 4ª.) A spring 70, mounted in a recess of the framework and surrounding a reduced end of the rod 49, bears against stud 62″ at one end and a wall of the recess at the other end, and aids in lowering said stud 62″ when knob 65 is released.

From what has been stated it will be seen that the tension on the needle-thread will be varied automatically by the operation of the rod 43 during the making of each stitch, whatever may be the character of the latter, and that when the feed mechanism is set for the making of one kind of stitch the tension will be charged to a certain definite extent by the action of the rod 49.

My improved feed mechanism may be variously modified without departure from the scope of this invention, and the use thereof is not restricted to a machine of the character herein described, for it may be employed in connection with various styles and class of machines.

No claims are herein made to the stitch-making mechanism including the tension device herein set forth except in so far as said mechanisms coact and combine with the improved feed mechanism described. Said stitch-forming mechanisms are illustrated, described, and claimed in my contemporaneously-pending application filed September 12, 1898, Serial No. 690,730, Patent Number 679,914, issued August 6, 1901.

It will be seen that the fabric or work is lifted from the throat-plate when the loop-taker engages a thread-loop, and is held there until the loop-taker substantially completes the operation of drawing out the loop; that such lifting of the fabric is preferably effected by the feeding-dog, which is elevated at about the time that the loop-taker enters a loop, and is there held substantially until the loop is drawn out, although the timing of the operation of the feeding-dog and the looper may obviously be varied somewhat within the scope of the invention; that the dog is advanced during the drawing out of the new loop and by preference is lowered approximately at the time that the loop is fully drawn out; that such dog remains approximately stationary in its elevated position during a considerable portion of the operation of drawing out the loop, and then quickly advances, falls, retreats, and rises to its initial position, where the feeding-stroke begins. It will further be seen that, in this instance, the looper-hook at first draws the thread in a direction which is quite diagonal to the direction of the needle-stroke; that at this time the dog is elevated and approximately stationary; that when the loop is brought more nearly in line with the direction of the needle, so that liability of pinching or chafing of the threads is reduced, the dog is rapidly lowered, this being at the time approximately that the new loop is completely drawn out. It will be understood that the danger of pinching the thread is greatest when the loop stands at the greatest angle to the needle. The dog is moved to a sufficiently high elevation for giving ample freedom of movement to the several strands of thread, and is held at such elevation for a prolonged time. One of the loop-takers draws out a thread-loop while another thereof is relinquishing the preceding loop. It will also be perceived that in this instance, means for lifting the dog are positively connected to a shaft D′ which directly actuates the looper and revolves twice during three needle-strokes; the dog-carrying bar K at one end is pivoted upon a rocking member 14 and at the other end is supported by a rocking member 15, the dog being carried between the ends of said bar; movement-trains ramify from the revoluble member 18 to said rocking members, the several members of said movement-trains being connected to one another and to said revoluble member by pivotal joints, and effecting a substantially horizontal advance movement from 7 to 1, at Fig. 26, then a combined advance and falling movement from 1 to 2, then a combined falling and retracting movement from 2 to 4, and then a combined retracting and lifting movement from 4 to 7. Said figure shows substantially a horizontal advance movement from 7 to 1, and curvilinear falling, retracting and elevating movements. The dog pauses between the lifting and advance movements thereof, the needle being in the cloth at this moment. It will be noted also that the rock-arms 14 and 15 have diverse movements; that the several members in each movement-train are connected to one another and to the driving-shaft $D^2$ by means of pivotal or circular joints, so that the desired movements of the feeding-dog are effected without the use of objectionable irregular cams, so that the machine may be driven at high speed with little or no noise and without danger of breakage or undue wear; that the shaft $D^2$ revolves constantly in one direction; that the looper revolves between said rock-arms 14 and 15; that the bar K extends across the looper from one of said arms to the other and is positively connected to each; that one end of the bar has a pin-and-slot engagement with the arm 15; that the dog is actuated by a crank or eccentric or wrist 18; that at least one member of the movement-trains which operate said dog is journaled directly upon said crank or eccentric, although it is obviously not essential in all cases that a single crank or eccentric be employed for effecting all of the movements of the dog, although preferable because of its compactness and simplicity and ease of construction and timing; that the said rocking members 14 and 15 are mounted upon corresponding ends of the rock-shafts R and R′; that a rocking member 16′ is mounted upon the opposite end of the shaft R′ and driven by a link 25 which is mounted upon the wrist carried by the shaft $D^2$; that a rocking member 16 is mounted upon the opposite end of the other rock-shaft R and is also driven by a link 25 mounted upon said wrist, this driving-link being, in this instance, the same one which operates the rock-shaft R′; and that the rock-shaft R′ is given a prolonged dwell at the termination of one of its rocking movements, whereby the dog is elevated, and a quick recovery at the termination of the other rocking movement, whereby the dog is depressed. It will further be seen that the separately pivoted device or lever $R^3$ intervenes between the rocking member 16′ or R′ and the driving-shaft $D^2$, said intervening lever being connected by a link 25 to the crank-pin or eccentric carried by said shaft $D^2$, and being also connected by a link 26 to the rocking device, including the parts 16′, R′ and 15, the relative arrangement of the parts being such that the shaft R′ is caused to recover quickly from one stroke and to make a pause at the completion of the other stroke, to the end that the down and up-strokes of the feeding-dog may be made quickly, so that it may remain elevated for a prolonged time; that the link 26 is moved during the dog-lifting operation substantially to a dead-center position with reference to the separately pivoted device $R^3$, for prolonging the time during which said dog is in its elevated position, said link being shown at Fig. 6 in the vicinity of its dead-center position or at the idle portion of its stroke, the dog being up and the idle movement of said link extending from the Fig. 6 position to a point where said link stands in rear of the axis of lever $R^3$, so that while said link is swinging between the Fig. 6 position and its rearmost position, there is no vertical movement of the dog, or at least not enough to be an objection; and that when said link is at the dead-center it crosses said axis. It will also be noted that the revoluble driving-shaft $D^2$ is connected to the actuating-arm 16 of the rock-shaft R by means of a device 21, which at one end is pivotally jointed to said operating-arm and at its other end is positively connected by means of a short link 19 to the wrist 18, and is also adjustably fulcrumed between its ends by means of the pivot-plug 30, said short link 19 being attached to the link 25 which connects said wrist to the independently mounted lever or crank $R^3$; that said short link is at the far dead-center at the termination of the dog-retracting stroke, the parts being then in about the Fig. 6 position, so that the recovery stroke is retarded, to the end that there may be a pause in the horizontal movement of the dog, as at this time the needle is in the fabric. It will be noticed that the length of the link 19 is so nearly equal to the radius of movement of the wrist 18 that for a considerable portion of the time said link 19 merely swings without moving endwise, so that the device 21 is held approximately stationary for a prolonged time; while at the upper end of the stroke, when the link 19 is passing the near dead-center, as at Fig. 7, the movement of said device 21 is extremely rapid, the general effect being that the advancing and retracting movements of the dog are accomplished at high speed, said dog remaining approximately stationary for a time at the initial point in its advance-stroke, so as to permit the needle to withdraw from the cloth, and also to avoid interference with the looping operations. Thus, at the termination of the dog-lifting operation, both of the diversely-rocking members which control said dog remain approximately stationary, and thereafter one of said rocking members quickly advances and retracts while the other thereof quickly lowers and elevates the dog.

By elevating the fabric from the plate for the purpose of relieving the pressure on the several strands of thread, so that one loop may pull out freely while a preceding one is drawn up, a new operation in sewing-machines is effected; and it will be understood that at this time the feeding or spool portion of the loop is likewise released from pressure between the cloth and the plate, and hence that the looper tends to draw thread off the spool as well as to draw up or tighten the preceding loop. By putting a tension on the thread, the delivery of the thread from the spool is thus avoided from the time the hook engages the new loop until the preceding loop is substantially tightened. By lifting the fabric I avoid pinching or chafing of the thread between the fabric and the throat-plate, particularly when the cloth is turned for changing the direction of the stitching; and by means of the described tension devices I also avoid the danger arising from such lifting of the fabric, and consisting in the liability of the thread to pay off prematurely from the spool. The length of time during which the thread is under tension may vary, but preferably it is under tension during the entire stitch-forming operation except at the period of the greatest distention of the loop.

Certain of the improvements herein set forth are of considerable importance in the formation of chain-stitches, especially those relating to the elevation of the fabric from the throat-plate, as obviously it is of moment that the several strands of thread should have great freedom of movement in the formation of a chain-stitch. It is also important that the thread be properly clamped in order to prevent, at the chain-stitching operation, premature paying off of the thread from the spool. It is also advantageous that when the loop-diverting mechanism is thrown into or out of operative position, the tension of the spring 40 should be varied.

It is not intended to limit the invention to the precise construction, arrangement, timing and operation herein shown, and many variations may be made within the scope thereof. Portions of my improvements may be used without others.

Having described my invention, I claim—

1. In a sewing machine, a feeding mechanism including a rock shaft, a feeding dog and means for lifting and depressing the same and comprising a rocking member acting thereon, said rocking member being mounted upon said rock shaft, and said rock shaft being also provided with an actuating arm, a revoluble driving shaft, a connection between said actuator arm and said driving shaft, said connection including an intervening lever and a link, an eccentric connected to said link and carried by said driving shaft, and said intervening lever being so connected to said rock shaft as to cause a prolonged dwell at one end of its rocking movement.

2. In a sewing machine, a feeding mechanism including a rock shaft, a feeding-dog and means for lifting and depressing the same and comprising a rocking member acting thereon and mounted upon said rock shaft, said rock shaft being provided with an actuating arm, an independently mounted lever, a link connecting the latter to said actuating arm, an eccentric carried by said driving shaft, a link connecting said lever to said crank pin or eccentric, and the relative arrangement of the parts being such that said rocking member is caused to recover quickly from one stroke and to make a pause at the completion of the other stroke.

3. In a sewing machine, the combination of a feeding dog, a rock shaft, a driving shaft, an eccentric upon said driving shaft, a rocking member for lifting and depressing said dog, said rocking member being mounted upon said rock shaft, the latter being provided with an actuating arm, a link connecting said arm to an independently mounted lever, a link connecting said lever to said eccentric carried by said driving shaft, and a rocking member for advancing and retracting said dog, a shaft whereon the last mentioned rocking member is mounted, said shaft being also provided with an operating arm, and said operating arm being positively connected to said driving shaft by means of a device which is fulcrumed between its ends and at one end is pivotally jointed to said operating arm, and at its other end is positively connected by means of a link to the link which connects said eccentric to said independently mounted lever.

4. In a sewing machine feeding mechanism, the combination with a revoluble driving shaft, of a feeding dog, a rocking member positively connected to the feeding dog for lifting and depressing the same, and a separately pivoted device intervening between said driving shaft and said rocking member, said separately pivoted device being positively driven by an eccentric carried by said driving shaft, and said rocking member being so connected to said intervening device as to be given a prolonged dwell at the end of its dog-lifting stroke, and means for advancing and retracting said dog.

5. In a sewing machine feed mechanism, the combination with a revoluble driving shaft, an eccentric carried thereby, a linkage connected to said eccentric, a feeding dog, of a rocking member positively connected to said feeding-dog for lifting and depressing the same, and a separately pivoted device intervening between said driving shaft and said rocking member, said separately pivoted device being positively driven by said eccentric carried by said driving shaft, means connecting the same to said rocking member, said means during the dog-lifting operation being carried slightly past the dead center, and at this portion of its movement crossing the axis of said separately pivoted device, the latter being connected by said linkage to said driving shaft, and means for advancing and retracting the feeding dog.

6. In a sewing machine feeding mechanism, the combination with a driving shaft, of a feeding dog, a rock shaft, an eccentric carried by said driving shaft, a rocking member for advancing and retracting said dog, said rocking member being mounted upon said rock shaft, said rock shaft being also provided with an operating arm which is actuated by said driving shaft, and said driving shaft being connected to said operating arm by means of a device which at one end is pivotally jointed to said operating arm and at its other end is pivotally connected by means of a short link to said eccentric carried by said driving shaft, and being also adjustably fulcrumed between its ends.

7. In a feed mechanism for sewing machines, the combination with parallel rock shafts, each having a pair of cranks, of a feed member actuated by two of the cranks of said rock shafts, an eccentric, a link connecting the eccentric with a crank on one of the rock shafts, an adjustable slide having a socket in one of its faces, a plug seated in the socket and having a bifurcated end fitted over said link, and linkages connecting the eccentric with a crank on the other rock shaft.

8. In a sewing machine, the combination with a feed dog, of a driving shaft, a looper, two rock shafts, rocking members upon corresponding ends of said rock shafts, a bar carrying the feed dog and mounted upon said rocking members, a rocking member mounted upon the opposite end of one of said rock shafts, a link for driving said rocking member, a rocking member mounted upon the opposite end of the other of said rock shafts, a link for driving the last mentioned rocking member, means including at least one member carried by said rock shafts for driving said links, said mechanism effecting a prolonged dwell of one of said rock shafts during the formation of the loop and at the termination of one of its rocking movements, and a quick recovery at the termination of the other thereof, and means for adjusting or regulating the timing of said movement.

9. In a sewing machine feed mechanism, the combination with a driving shaft, an actuator provided upon said shaft, a short link connected to said actuator, and a feed dog, of a rocking member positively connected to said feed dog for advancing and retracting the same, a device through which the movement is transmitted from said driving shaft to said rocking member, an arm rigid with said rocking member, a short link, said transmitting device being at one end pivotally jointed to said arm and being at its other end connected by the said short link to the actuator which is provided upon the driving shaft and being also fulcrumed approximately between its ends, said short link being at the dead center at the termination of the dog retracting movement whereby the recovery of said dog from its retracted stroke is retarded, and whereby also the recovery of said dog from its advance stroke is accelerated, and means for regulating the movement or throw of the feed dog.

10. In a sewing machine feed mechanism, the combination with a feed dog, of a revoluble driving shaft, an eccentric carried thereby, a link connected to said crank or eccentric, of a rocking member positively connected to said feed dog for lifting and depressing the same, means for regulating the throw or movement of one of said rocking members whereby to limit or extend the movement of the feed dog, a separately pivoted device intervening between said driving shaft and said rocking member, a link connecting said separately pivoted device to said rocking member for positively driving said separately pivoted device from said eccentric, said link at the dog lifting operation being carried slightly past the dead center so as to prolong the time in which said dog is in an elevated position, a member also positively connected to said feeding dog for advancing and retracting the same and moved by said driving shaft in such a manner as to prolong the dwell between the retracting and advance strokes of said dog, for causing one end of the dog to move in a substantially horizontal plane.

11. In a sewing machine feeding mechanism, the combination with a revoluble driving shaft, of a feeding dog, a rocking member positively connected to the feeding dog for lifting and depressing the same, a separately pivoted device intervening between said driving shaft and said rocking member, an eccentric carried by said driving shaft for positively driving the separately pivoted member, a link connecting the separately pivoted device and the rocking member, said link, during the dog lifting operation, being carried slightly past the dead center, so as to prolong the time in which said dog is in an elevated position; a rocking member also positively connected to said feeding dog for advancing and retracting the same, an arm rigidly connected thereto, and a device through which movement is transmitted from said driving shaft to the last mentioned rocking member, said transmitting device being at one end pivotally jointed to said arm, and a short link connecting its other end to the eccentric, a fulcrum support for said transmitter between its ends, said short link being at the dead center approximately at the time that the first mentioned link is at dead center and a device for regulating the movement of the dog.

12. In a sewing machine feeding mechanism, the combination with a feeding dog, of a revoluble driving shaft, and an eccentric carried thereby, a rocking member positively connected to one end of the feeding dog for lifting and depressing the same, and a separately pivoted device intervening between said driving shaft and said rocking member, said separately pivoted device being positively driven by said eccentric, and means for so connecting said rocking member to said intervening device as to give said rocking member a prolonged dwell at the end of its dog lifting stroke, and regulatable means connected to the other end of the dog for regulating the length of feeding stroke thereof.

HUBERT P. RICHARDS.

Witnesses:
HENRY BISSELL,
R. W. BISSELL.